(12) United States Patent
Kutzberger et al.

(10) Patent No.: US 12,259,025 B2
(45) Date of Patent: Mar. 25, 2025

(54) METHOD FOR SETTING AN AXIAL PRELOAD FORCE OF A ROLLER SCREW DRIVE OF AN ACTUATOR OF A STEERING DEVICE OF A MOTOR VEHICLE

(71) Applicant: Schaeffler Technologies AG & Co. KG, Herzogenaurach (DE)

(72) Inventors: Silvia Kutzberger, Herzogenaurach (DE); Mario Arnold, Aurachtal (DE); Kathrin Gumbrecht, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 249 days.

(21) Appl. No.: 18/016,142

(22) PCT Filed: Apr. 19, 2021

(86) PCT No.: PCT/DE2021/100355
§ 371 (c)(1),
(2) Date: May 16, 2023

(87) PCT Pub. No.: WO2022/017553
PCT Pub. Date: Jan. 27, 2022

(65) Prior Publication Data
US 2023/0265916 A1 Aug. 24, 2023

(30) Foreign Application Priority Data
Jul. 23, 2020 (DE) .................... 10 2020 119 437.4

(51) Int. Cl.
*F16H 25/20* (2006.01)
*B62D 5/04* (2006.01)
*F16H 25/22* (2006.01)

(52) U.S. Cl.
CPC ..... *F16H 25/2006* (2013.01); *F16H 25/2252* (2013.01); *B62D 5/0451* (2013.01); *F16H 2025/2081* (2013.01)

(58) Field of Classification Search
CPC F16H 25/2252; F16H 25/2006; B62D 5/0451
See application file for complete search history.

(56) References Cited

U.S. PATENT DOCUMENTS 3,226,809 A * 1/1966 Perrin ................. F16H 25/2252
29/90.01
4,754,829 A * 7/1988 Shimizu ............... B62D 5/0424
180/446

(Continued)

FOREIGN PATENT DOCUMENTS

DE 3712154 A1 10/1987
DE 102018116867 A1 1/2020

(Continued)

*Primary Examiner* — Jake Cook
(74) *Attorney, Agent, or Firm* — Matthew V. Evans (57) ABSTRACT

A method is disclosed for setting an axial preload force of a roller screw drive rotatably mounted in a housing. The housing is split transversely into a first and a second housing part. The roller screw drive is inserted with two axially spaced bearings into the second housing part. An axial preload force is applied which is transmitted from the first bearing via the roller screw drive to the second bearing. An axial load spacing between the bearing supporting surface of the first bearing and a second housing edge of the second housing part is measured. An adjusting nut is screwed into the first housing part until an axial adjustable spacing is the same size as the measured axial load spacing. The adjusting nut is then secured in place in the first housing part, and the two housing parts are connected to one another.

20 Claims, 4 Drawing Sheets

(56) References Cited

U.S. PATENT DOCUMENTS

| | | | |
|---|---|---|---|
| 11,994,191 B2 * | 5/2024 | Weis | F16H 25/2252 |
| 12,049,944 B2 * | 7/2024 | Weis | F16H 25/2252 |
| 2022/0252141 A1 * | 8/2022 | Wuebbolt-Gorbatenko | B62D 7/148 |

FOREIGN PATENT DOCUMENTS

| | | |
|---|---|---|
| DE | 102019112480 B3 | 2/2020 |
| JP | 2011025756 A | 2/2011 |

* cited by examiner

METHOD FOR SETTING AN AXIAL PRELOAD FORCE OF A ROLLER SCREW DRIVE OF AN ACTUATOR OF A STEERING DEVICE OF A MOTOR VEHICLE

CROSS-REFERENCE TO RELATED APPLICATIONS

This application is the U.S. National Phase of PCT Application No. PCT/DE2021/100355 filed on Apr. 19, 2021, which claims priority to DE 10 2020 119 437.4 filed on Jul. 23, 2020, the entire disclosures of which are incorporated by reference herein.

TECHNICAL FIELD

The present disclosure relates to a method for setting an axial preload force of a roller screw drive, which converts a rotational movement into a translational movement. Roller screw drives can be rotatably mounted on a machine part within a housing. In some applications, a certain axial preload force between the roller screw drive and the housing is desired with a view to play or friction. The disclosure relates to a setting of this axial preload force of roller screw drives, which are part of an actuator of a steering device of a motor vehicle, such as that for rear-wheel steering or steer-by-wire steering.

BACKGROUND

An actuator has become known from DE 10 2018 116 867 A1, the roller screw drive of which is formed by a planetary roller screw drive, which is provided with a nut arranged on a threaded spindle, which is split into two nut parts transversely to the spindle axis, and with planetary rollers arranged between the threaded spindle and the nut, which mesh with the planet-side groove profile thereof on the one hand with a nut-side groove profile and on the other hand with a thread profile of the threaded spindle. This planetary roller screw drive also has a planetary roller carrier having pockets, which are arranged distributed over the circumference, and in which the planetary rollers are rotatably mounted about the planetary roller axis thereof.

The planetary roller carrier surrounds the nut, the nut parts of which are preloaded using various technical measures to enable a freedom from play when engaged with the planetary rollers. This publication proposes installing a spacer between the nut parts. It is also proposed as an alternative to insert the nut parts in two screw sleeves on which the nut parts are axially supported and which are screwed together until the aforementioned freedom from play is achieved.

It is also proposed in this disclosure to mount the screw drive by means of axial angular contact roller bearings on a housing in which the screw drive is installed. There must also be an axial play or preloading between the housing and the screw drive at this bearing point to ensure that the actuator functions correctly.

These measures are complex and require a corresponding amount of space within the planetary roller carrier. In automotive applications in particular, however, there is regularly a need for cost-effective, space-saving planetary screw drives, in particular when they are used in actuators for a rear-wheel steering system or a steer-by-wire steering system.

DE 10 2019 112 480 B3 discloses a chassis actuator of a rear-wheel steering system having an electric motor and having a roller screw drive arranged in a housing, which is rotatably mounted by means of bearings arranged to be axially spaced apart from one another, and the axially displaceable threaded spindle of which is part of a thrust rod penetrating the housing. The two bearings are supported on the housing, wherein a preloading nut penetrated by the thrust rod is screwed into a thread of the housing and is engaged with the end-side supporting surface thereof against the one bearing.

DE3712155 discloses a power steering system having an electric motor and a ball screw drive arranged in a housing, which is rotatably mounted by means of bearings arranged to be axially spaced apart from one another, and the axially displaceable threaded spindle of which is part of a thrust rod penetrating the housing. The housing is split transversely to the thrust rod into two housing parts, and the first bearing is assigned to the first housing part and the second bearing to the second housing part, wherein an adjusting nut penetrated by the thrust rod is screwed into a thread of the first housing part and is engaged with the end-side supporting surface thereof against the first bearing.

JP2011-025756 A discloses an electromechanical steering device with an electric motor and a ball screw drive arranged in a housing, which is rotatably mounted by means of bearings arranged to be axially spaced apart from one another, and the axially displaceable threaded spindle of which is part of a thrust rod penetrating the housing. The housing is split transversely to the thrust rod into two housing parts, and the first bearing is assigned to the first housing part and the second bearing to the second housing part, wherein an adjusting nut penetrated by the thrust rod is screwed into a thread of the first housing part and is engaged with the end-side supporting surface thereof against the first bearing.

Accordingly, methods are known for setting an axial preload force, with which the roller screw drive, which is rotationally driven in the housing, can be placed under axial preload.

After the roller screw drive has been installed in the housing, it is almost impossible to subsequently change and/or check the setting of the preload force.

SUMMARY

The present disclosure was based on the object of specifying a method for setting the axial preload force of the roller screw drive that can be carried out reliably.

According to the disclosure, this object was achieved by the method described herein.

The method for setting an axial preload force of a roller screw drive comprises the roller screw drive which is arranged in a housing, which can be formed by known ball screw drives, rolling screw drives, and planetary roller screw drives.

The method is suitable for a steering device of motor vehicles, in particular for a rear-wheel steering system. Usually, the roller screw drive has a rotationally driven drive part, the rotation of which is converted into a translational movement of a threaded spindle of the roller screw drive. An electric motor can drive the drive part via a toothed belt drive or spur gear toothing.

The threaded spindle is part of a thrust rod that penetrates the housing. The threaded spindle can have screw-in pins at both ends, which are screwed into threaded bores in the thrust rod parts. Fork heads can be attached to the ends of the thrust rod, which articulate wheel carriers.

The housing is split into housing parts transversely to the thrust rod. A first housing part has a first housing edge located transversely to the spindle axis and a second housing part has a second housing edge located transversely to the spindle axis. The housing edges are designed to rest against one another. After the housing parts have been assembled, the housing edges rest against one another. These housing edges can fully lie in a common transverse plane located transversely to the spindle axis. However, it can be structurally necessary to provide housing edges on both housing parts that are arranged axially offset from one another, all of which lie in imaginary planes transverse to the spindle axis and complement one another, so that both housing parts fully rest against one another with the housing edges thereof.

The roller screw drive is rotatably mounted in the housing by means of bearings arranged axially spaced apart from one another. These first and second bearings can each comprise a radial bearing and an axial bearing. The first bearing is associated with the first housing part and the second bearing is associated with the second housing part.

When used as an actuator in a rear-wheel steering system, the radial forces acting on the thrust rod are significantly lower than the transmitted axial forces, which are transmitted via the thrust rod during operation of the actuator. Axial angular contact roller bearings can be used as these bearings, the tapered raceways of which are inclined to an imaginary plane transverse to the spindle axis. These axial angular contact roller bearings can transmit both the lower radial and the higher axial forces.

An adjusting nut penetrated by the thrust rod is screwed into a thread of the first housing part and is positioned with the end-side adjusting nut supporting surface thereof against a bearing supporting surface of the first bearing. The adjusting nut can be arranged to be coaxial to the thrust rod. The bearing supporting surface can be an end face of a bearing disk, the other end face of which can be designed as a raceway of the first bearing.

It can be useful if the adjusting nut supporting surface is also designed as a raceway for the first bearing. In this case, the bearing supporting surface of the first bearing can be defined by a plane tangent to rolling elements of the first bearing.

When fully assembled, the adjusting nut supporting surface and the bearing supporting surface of the first bearing rest against one another or coincide.

An axial bearing play or an axial preload between the first and the second bearing is determined by the screwing depth of the adjusting nut into the thread of the first housing part. This means that an axial play or a desired preload of the roller screw drive in the housing is determined by the screwing depth of the adjusting nut.

The following steps are provided for setting the desired axial preload force: The roller screw drive is inserted with the two bearings into the second housing part.

An axial preload force is then applied, which is transmitted from the first bearing via the roller screw drive to the second bearing. Under this desired axial preload force, any play that might be present is minimized, which in the assembled arrangement can be composed of the bearing play of the first and second bearings, as well as any existing play within the roller screw drive.

An axial load distance is now measured between the bearing supporting surface of the first bearing and the second housing edge of the second housing part, into which the screw drive with the two bearings is inserted.

If the first bearing is an angular contact roller bearing, the measurement of the load distance is conveniently carried out from or to an easily accessible reference line on the first bearing. For example, the reference point can lie on a circular path having the mean diameter of the angular contact roller bearing, which lies on the tapered bearing supporting surface. If this angular contact roller bearing has a running disk against which the adjusting nut is placed with the supporting surface thereof, this reference line lies advantageously on the end face of the running disk facing the adjusting nut.

The adjusting nut can now be screwed into the first housing part until an axial adjustment distance from the end-side adjusting nut supporting surface to the first housing edge of the first housing part is the same as the measured axial load distance described above. In the case of the angular contact roller bearing, the reference line for measuring the axial adjustment distance lies on the same circular path as was previously described for the first bearing.

A securing in place of the adjusting nut on the first housing part then takes place. The adjusting nut can be secured in place on the first housing part by means of a screw lock. The screw lock can be formed by a material connection between the first housing part and the adjusting nut. For example, an initially liquid locking agent is offered under the brand name Loctite, which is applied to the thread and gradually hardens, ensuring a reliable securing in place of the adjusting nut. A coating is known under the brand name Precote, which is also applied to the adjusting nut and ensures a problem-free securing in place.

Alternatively, what is termed a thread lock can be provided as a screw lock. In this case, a thread is inserted or pressed into a longitudinal groove of the adjusting nut, which breaks through the thread flanks. The screwed-in adjusting nut is secured in place with the help of the thread, which creates a clamping connection between the adjusting nut and the thread of the first housing part.

The two housing parts are now connected to one another, for example screwed together, and the two housing parts rest against one another with the housing edges (30, 31) thereof. This position ensures that the desired axial preload force is set. This reliable setting is made possible by the above-described measurement of the load distance and the setting of the adjustment distance, which in the case of the coordinated reference lines—as described above—is the same amount as the load distance.

The adjusting nut can be screwed into a threaded bore of the first housing part arranged to be coaxial to the thrust rod and is provided with a radial rim having the adjusting nut supporting surface.

The drive part mentioned above can be formed by a nut of the roller screw drive, between which and the threaded spindle are arranged rolling elements that engage on the one hand with a thread of the threaded spindle and on the other hand with a nut-side engagement profile.

In the case of an example embodiment of a planetary roller screw drive, it is expedient to rotationally drive a planetary roller carrier forming the drive part, in the pockets of which are arranged planetary rollers which mesh on the one hand with the thread of the threaded spindle and on the other hand with a grooved profile of the nut. Planetary screw drives driven in this way are pitch-accurate, so they work without slipping; a full revolution of the planetary roller carrier causes a displacement of the threaded spindle by the amount of the pitch of the thread of the threaded spindle.

The planetary roller carrier can be constructed in several parts and comprises a sleeve element surrounding the nut, on both axial sides of which flanges are connected to the sleeve element in a non-rotatable manner, wherein at least one of the flanges has axial play relative to the sleeve element. In this case it is favorable to use one of the axial angular contact roller bearings each between the flanges of the planetary roller carrier and the two housing parts on the one hand and to arrange one axial roller bearing each between the flanges of the planetary roller carrier and the nut on the other hand.

In this further development, the adjusting nut can be used to set a specified play or a specified axial preload of the planetary screw drive, namely the play or preload between the flanges of the planetary roller carrier and the two housing parts on the one hand and the play or preload between these flanges and the nut on the other.

In this example, the axial forces acting in the threaded spindle during operation of the actuator are conducted via the nut and the axial roller bearing into the flanges of the planetary roller carrier and finally via the axial angular contact roller bearing into the housing.

The interaction of the housing, which is split into two housing parts transversely to the spindle axis, in conjunction with the two associated bearings and with the adjusting nut, enable an assembly and a setting of a desired preload force in a simple manner.

BRIEF DESCRIPTION OF THE DRAWINGS

The disclosure is explained in more detail below with reference to an exemplary embodiment shown in a total of seven figures. In the figures.

DETAILED DESCRIPTION

Figure 1:
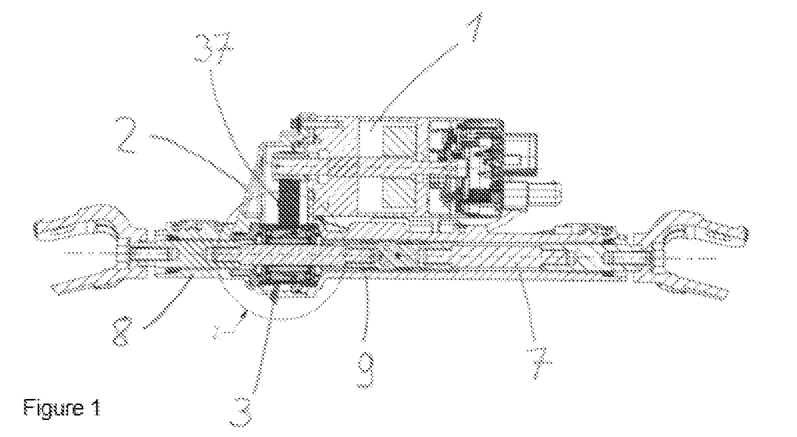
FIG. 1 shows an actuator of a rear-wheel steering system of a motor vehicle.

FIG. 1 shows a schematic representation of an actuator for a steering device of a motor vehicle, specifically for a rear-wheel steering system.

The actuator is provided with an electric motor 1 and has a roller screw drive 3 arranged in a housing 2, which is rotatably mounted in the housing 2 by means of bearings 4, 5 arranged axially spaced apart from one another. An axially displaceable threaded spindle 6 is part of a thrust rod 7 penetrating the housing 2.

The housing 2 is split transversely to the thrust rod into housing parts 8, 9. The first bearing 4 is associated with the first housing part 8 and the second bearing 5 is associated with the second housing part 9.

An adjusting nut 10 penetrated by the thrust rod 7 is screwed into a thread 11 of the first housing part 8. The first bearing 4 is supported or mounted on an end-side supporting surface 12 of the adjusting nut 10. An axial bearing distance between the two bearings 4, 5 is set by screwing the adjusting nut 10 into the thread 11.

In the exemplary embodiment, the adjusting nut 10 is screwed into a threaded bore 13 of the first housing part 8 which is arranged coaxially to the thrust rod and forms the thread 11. On the end face thereof facing the first bearing 4, the adjusting nut 10 is provided with a radial rim 14 having the supporting surface 12.

In the exemplary embodiment, the bearings 4, 5 are formed by axial angular contact roller bearings 15, the tapered raceways 17 of which are inclined to a plane arranged transversely to the spindle axis.

The adjusting nut 10 has a tapered supporting surface 12 adapted to the axial angular contact roller bearing 15 as a support for the axial angular contact roller bearing.

Figure 2:
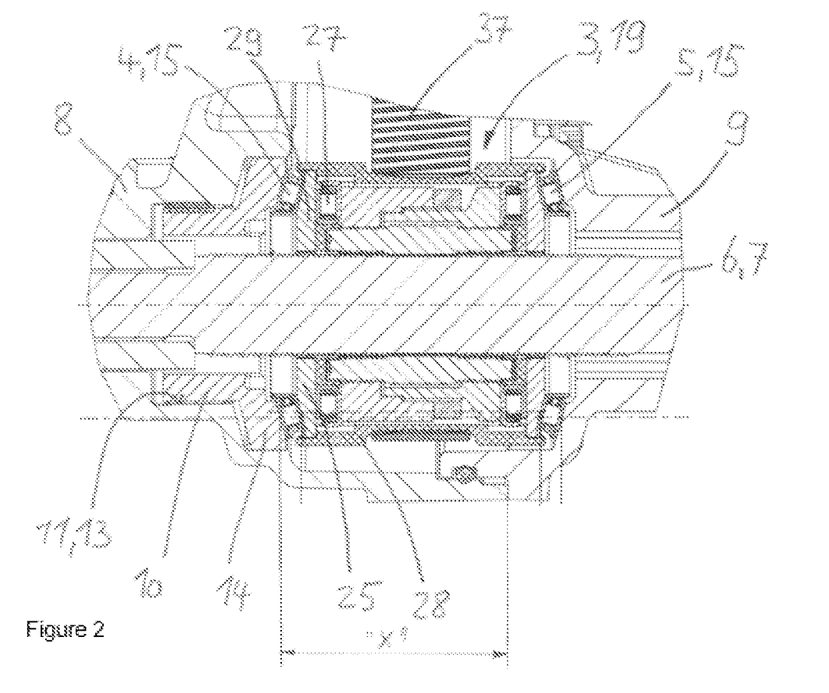
FIG. 2 shows an enlargement of a section of FIG. 1.
Figure 7:
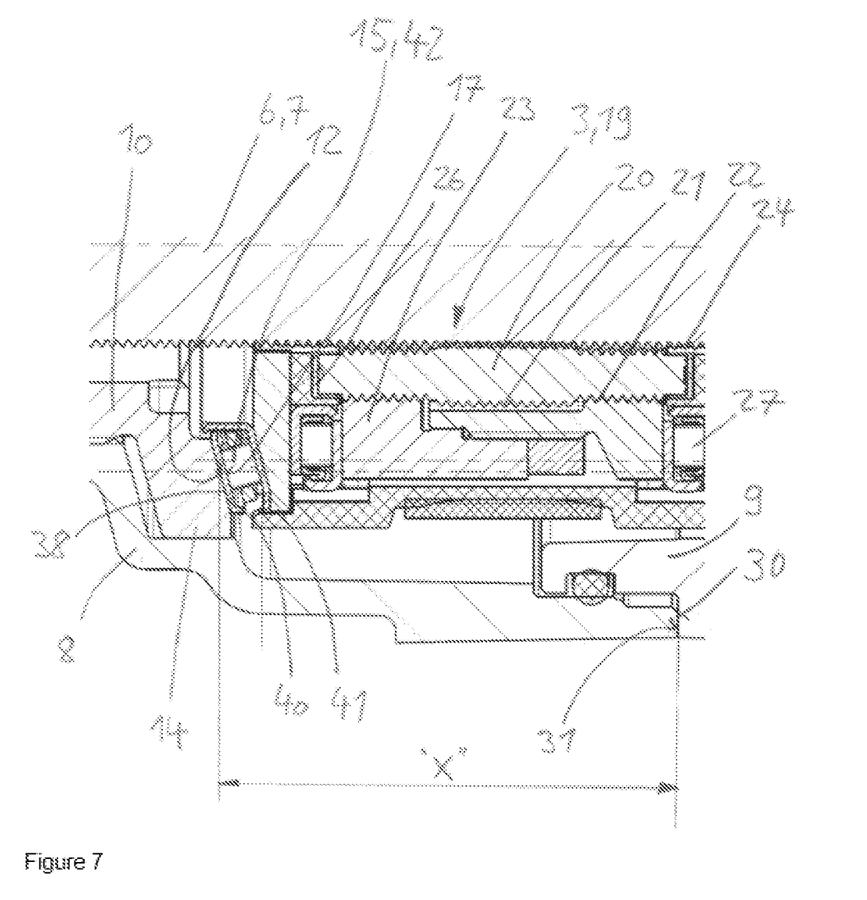
FIG. 7 shows another enlargement of a section of FIG. 1.

The detail enlargements in FIGS. 2 and 7 show an enlarged view of the roller screw drive 3, which is formed by a planetary roller screw drive 19 in the exemplary embodiment. Planetary rollers 20 mesh with the groove profiles 21 thereof on the one hand with groove profiles 22 of a nut 23 and on the other hand with a thread 24 of the threaded spindle 6.

A rotationally driven planetary roller carrier 25 accommodates the planetary rollers 20 in the pockets 26 thereof distributed over the circumference. The planetary roller carrier 25 is mounted on the housing 2 on the one hand by means of the axial angular contact roller bearings 15, 16 and on the other hand by means of axial roller bearings 27, which are arranged between the planetary roller carrier 25 and the nut 23.

The planetary roller carrier 25 has a sleeve element 28 that engages around the nut 23 and flanges 29 arranged on both axial sides, which are connected to the sleeve element 28 in a non-rotatable and axially displaceable manner with respect to one another. One of the axial roller bearings 27 is arranged between the flanges 29 and the nut 23, and one of the axial angular contact roller bearings 15 is arranged between the flanges 29 and the housing 2.

The electric motor 1 mentioned at the outset drives the planetary roller carrier 25 of the planetary roller screw drive 19 via a belt drive 37 (FIGS. 1, 2). Under the rotation thereof, the planetary rollers 20 orbit the threaded spindle 6 and roll off the threaded spindle 6 and the nut 23. The rolling of the planetary rollers 20 causes the nut 23 to rotate relative to the threaded spindle 6 and to the planetary roller carrier 25. The thrust rod 7 is displaced axially in this way.

Figure 3:
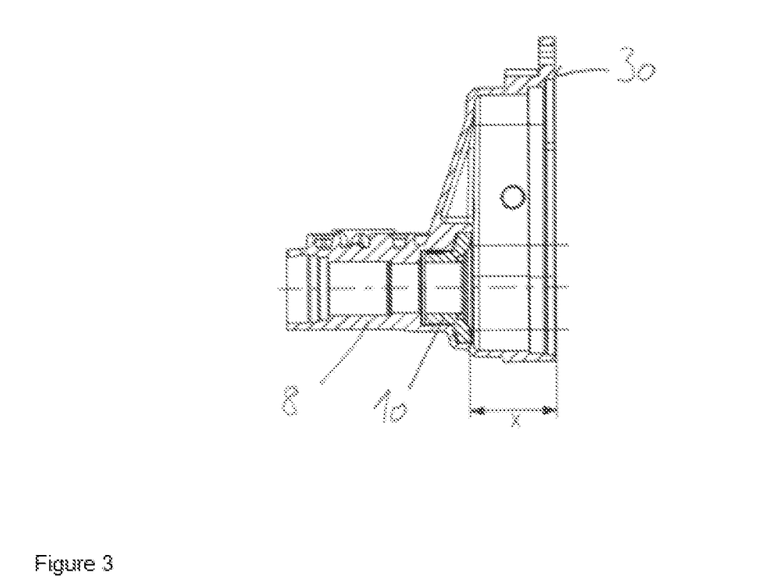
FIG. 3 shows a detail from FIG. 1.
Figure 4:
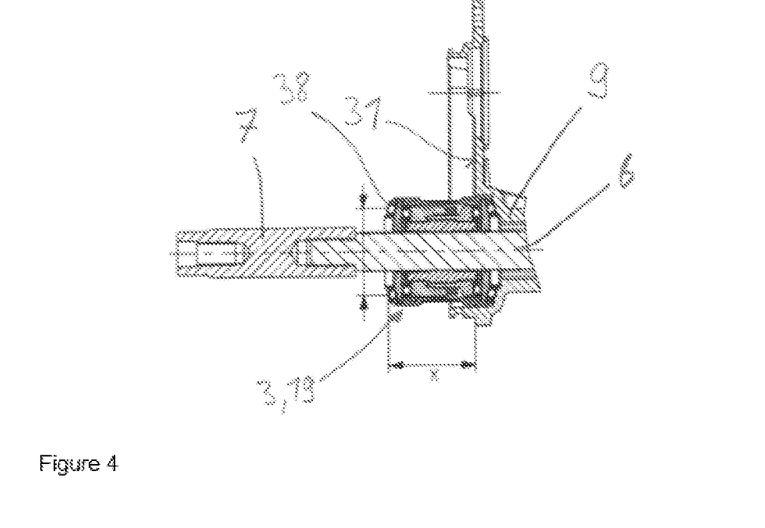
FIG. 4 shows further details from FIG. 1.

FIGS. 3 and 4 clearly show the first housing part 8, which has a first housing edge 30 located transversely to the spindle axis and the second housing part 9 thereof has a second housing edge 31 located transversely to the spindle axis, which rest against one another, as can be clearly seen in FIG. 2.

Figure 5:
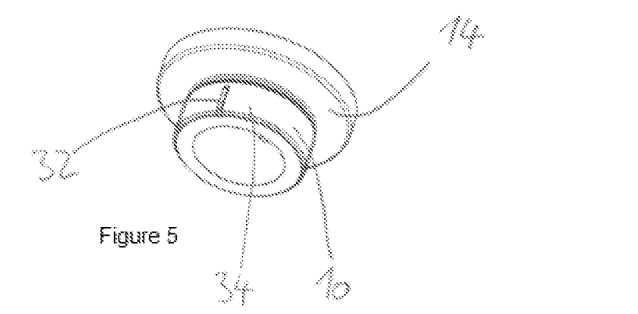
FIG. 5 shows a detail from FIG. 1.
Figure 6:
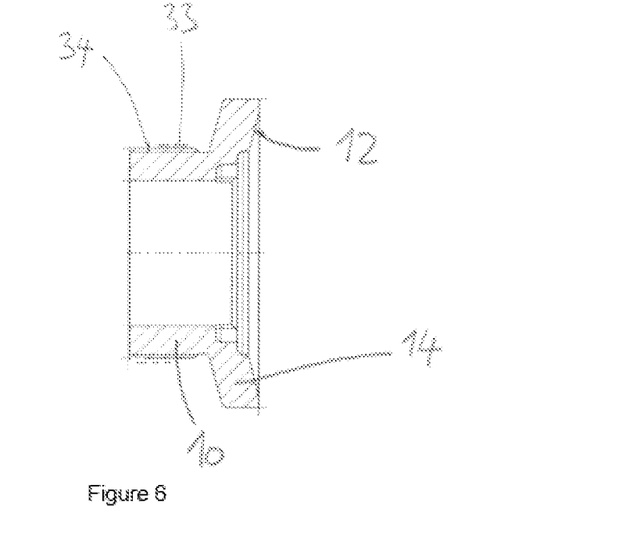
FIG. 6 shows a variant of the detail from FIG. 5.

FIGS. 5 and 6 show two examples of a screw lock, by means of which the adjusting nut 10 is secured in place on the first housing part 8. The screw lock according to FIG. 5 is carried out by a thread lock 32 between the first housing part 8 and the adjusting nut 10, and according to FIG. 6 is formed by a material connection 36 by means of a coating 33 of the screw thread 34 of the adjusting nut 10.

In the case of the thread lock 32, a special thread 35 is pressed into a longitudinal groove that is made in the screw thread 34.

In the case of the coating 33, a central thread portion of the screw thread 34 is coated.

FIG. 7 shows a further enlargement of a section of FIG. 1, specifically in the area of the first bearing 4, that is the axial angular contact roller bearing 15. The running disks 40, 41 thereof and the set of rollers 42 arranged between the running disks can be clearly seen. A mean bearing diameter $d_L$ circumscribes a circular path that forms a reference line on an end face 43 of the running disk 40 facing the adjusting nut 10, from which a distance "x" can be measured in the axial direction to the second edge of the housing edge 31, as is explained in more detail below.

The setting of a desired axial preload of the planetary roller screw drive 19 can be carried out in a simple manner with the proposed actuator. The planetary roller screw drive 19 is inserted with the two axial angular contact roller bearings 15 into the second housing part 9 (FIG. 4). The axial angular contact roller bearing 15 as the second bearing is inserted in the intended bearing point thereof of the second housing part 9. The other axial angular contact roller bearing 15 as the first bearing 4 is also mounted. Both axial angular contact roller bearings 15 are arranged on both sides of the flanges 29 of the planetary roller carrier 25.

An axial load is now introduced, which is transmitted from the first bearing 4—axial angular contact roller bearing 15—via the planetary roller screw drive 19 to the second bearing 5—thus the other axial angular contact roller bearing 15. This axial load is so great that a desired preload force is set. An axial load distance "X" is now measured (FIG. 4) starting from the reference line, which is formed as a circular path with the mean bearing diameter "$d_L$" of the axial angular contact roller bearing 15 on the side of the bearing disk 40 thereof facing the adjusting nut 10, up to the second housing edge 31 of the second housing part 9.

The adjusting nut 10 can now be screwed into the first housing part 8 (FIG. 3) and an axial adjustment distance can be measured, starting from a circular reference line on the tapered supporting surface 12 of the adjusting nut 10, with the mean bearing diameter "$d_L$" of the axial angular contact roller bearing 15. Starting from this reference line, the axial adjustment distance to the first housing edge 30 of the first housing part 8 is set (see FIG. 3). The adjusting nut 10 is screwed in until the axial adjustment distance has reached the amount "x".

A securing in place of the adjusting nut 10 in the first housing part 8 reliably maintains the preload once it has been set during operation of the actuator. Finally, the two housing parts 8, 9 can be assembled and the actuator can be completed.

The reference lines on the tapered supporting surface 12 and on the bearing disk 40 are in the same place in the axial direction after assembly is complete and coincide. The housing edges 30, 31 of the two housing parts 8, 9 are also in the same place in the axial direction after assembly is complete and coincide. As a result, the adjustment distance and the load distance "X" are of the same amount.

The two housing parts 8, 9 can now be screwed together.

After assembly, the desired axial preload force is set on the roller screw drive.

LIST OF REFERENCE SYMBOLS

1 Electric motor
2 Housing
3 Roller screw drive
4 First bearing
5 Second bearing
6 Threaded spindle
7 Thrust rod
8 First housing part
9 Second housing part
10 Adjusting nut
11 Thread
12 Adjusting nut supporting surface
13 Threaded bore
14 Radial rim
15 Axial angular contact roller bearing
17 Tapered raceway
19 Planetary roller screw drive
20 Planetary rollers
21 Groove profile
22 Groove profile
23 Nut
24 Thread
25 Planetary roller carrier
26 Pockets
27 Axial roller bearings
28 Sleeve element
29 Flange
30 First housing edge
31 Second housing edge
32 Thread lock
33 Coating
34 Screw thread
35 Thread
36 Material connection
37 Belt drive
38 Bearing supporting surface
40 Running disk
41 Running disk
42 Roller set
$d_L$ Mean bearing diameter

The invention claimed is:

1. A method for setting an axial preload force of a roller screw drive rotatably mounted in a housing via first and second bearings which are axially spaced apart from one another, and a threaded spindle of the roller screw drive is part of a thrust rod penetrating the housing, which is split transversely to the thrust rod into a first housing part and a second housing part, and the first bearing is assigned to the first housing part and the second bearing is assigned to the second housing part, and the first housing part has a first housing edge located transversely to a spindle axis and the second housing part has a second housing edge located transversely to the spindle axis, and the first and second housing edge are configured to rest against one another, and an adjusting nut penetrated by the thrust rod is screwed into the first housing part and is engaged with a bearing supporting surface of the first bearing via an end-side adjusting nut supporting surface of the adjusting nut, the method comprising:

inserting the roller screw drive with the first and second bearings into the second housing part, applying the axial preload force, which is transmitted from the first bearing via the roller screw drive to the second bearing, measuring an axial load spacing between the bearing supporting surface of the first bearing and the second housing edge of the second housing part, screwing the adjusting nut into the first housing part until an axial adjustment spacing between the end-side adjusting nut supporting surface and the first housing edge of the first housing part is equal to the measured axial load spacing, securing the adjusting nut to the first housing part, and connecting the first and second housing parts to one another, such that both bear against one another via respective first and second housing edges.

2. The method according to claim 1, wherein the adjusting nut is secured to the first housing part via a screw lock.

3. The method according to claim 2, wherein the screw lock is formed by a material connection between the first housing part and the adjusting nut.

4. The method according to claim 1, wherein the adjusting nut is screwed into a threaded bore of the first housing part arranged to be coaxial to the thrust rod and the adjusting nut is provided with a radial rim having the end-side adjusting nut supporting surface.

5. The method according to claim 1, wherein the first and second bearings are axial angular contact roller bearings with tapered raceways.

6. The method according to claim 5, wherein the end-side adjusting nut supporting surface is tapered to support the axial angular contact roller bearing.

7. The method according to claim 1, wherein the roller screw drive is a planetary roller screw drive, and the planetary rollers mesh with a groove profile of a nut and a thread of the threaded spindle, and a rotationally driven planetary roller carrier is configured to receive the planetary rollers via pockets distributed over a circumference of the planetary roller carrier, and the planetary roller carrier is mounted on the housing via axial angular contact roller bearings and axial roller bearings arranged between the planetary roller carrier and the nut.

8. The method according to claim 7, wherein the planetary roller carrier has a sleeve element surrounding the nut and a first flange and a second flange arranged on each respective axial side of the sleeve element are non-rotatably connected to the sleeve element, wherein
one of the axial roller bearings is arranged between the first flange and the nut, and a second one of the axial roller bearings is arranged between the second flange and the nut, and
one of the axial angular contact roller bearings is arranged between the first flange and the housing, and a second one of the axial angular contact roller bearings is arranged between the second flange and the housing.

9. The method according to claim 8, wherein the first and second flanges are axially displaceable relative to the sleeve element.

10. The method according to claim 2, wherein the screw lock is formed by a thread lock arranged between the first housing part and the adjusting nut.

11. A method for setting an axial preload force of a roller screw drive rotatably mounted via first and second bearings within a housing having a first housing part and a second housing part, the method comprising:
inserting the roller screw drive with the first and second bearings into the second housing part,
applying the axial preload force such that the axial preload force is transmitted from the first bearing to the second bearing via the roller screw drive,
measuring an axial load spacing between a bearing support surface of the first bearing and a second housing edge of the second housing part, the axial load spacing corresponding with the axial preload force,
screwing an adjusting nut into the first housing part until an axial adjustment spacing between an end-side adjusting nut support surface of the adjusting nut and a first housing edge of the first housing part is equal to the measured axial load spacing,
securing the adjusting nut to the first housing part, and attaching the first and second housing parts to one another.

12. The method of claim 11, wherein the first and second housing parts bear against one another when they are attached to each other.

13. The method of claim 11, wherein the end-side adjusting nut support surface is tapered.

14. The method of claim 11, wherein the first and second bearings are axial angular contact roller bearings with tapered raceways.

15. The method of claim 11, wherein the adjusting nut is screwed into a threaded bore of the first housing part, the threaded bore arranged to be coaxial to a threaded spindle of the roller screw drive.

16. The method of claim 15, wherein the adjusting nut includes a radial rim having the end-side adjusting nut supporting surface.

17. The method of claim 11, wherein the roller screw drive is a planetary roller screw drive comprising a threaded spindle, a grooved nut, and planetary rollers configured to mesh with a groove profile of the grooved nut and a thread of the threaded spindle.

18. The method of claim 17, wherein the roller screw drive further comprises a planetary roller carrier mounted on the housing, the planetary roller carrier configured to receive the planetary rollers about a circumference of the planetary roller carrier, and the planetary roller carrier is mounted on the housing via axial angular contact roller bearings and axial roller bearings arranged between the planetary roller carrier and the nut.

19. The method of claim 18, wherein the planetary roller carrier has a sleeve element surrounding the nut and a first flange and a second flange arranged on each respective axial side of the sleeve element are non-rotatably connected to the sleeve element.

20. The method of claim 19, wherein:
one of the axial roller bearings is arranged between the first flange and the nut, and a second one of the axial roller bearings is arranged between the second flange and the nut, and
one of the axial angular contact roller bearings is arranged between the first flange and the housing, and a second one of the axial angular contact roller bearings is arranged between the second flange and the housing.

* * * * *